Dec. 22, 1959 R. PETH 2,918,571

COMMUNICATION SYSTEM

Filed July 25, 1958 3 Sheets-Sheet 1

INVENTOR.
Robert Peth
BY Mueller & Aichele

Attys.

INVENTOR.
Robert Peth
BY Mueller & Aichele
Attys.

Dec. 22, 1959 R. PETH 2,918,571

COMMUNICATION SYSTEM

Filed July 25, 1958 3 Sheets-Sheet 3

INVENTOR.
Robert Peth
BY Mueller & Aichele
Attys.

United States Patent Office 2,918,571

Patented Dec. 22, 1959

2,918,571

COMMUNICATION SYSTEM

Robert Peth, Chicago, Ill., assignor to Motorola, Inc., Chicago, Ill., a corporation of Illinois Application July 25, 1958, Serial No. 750,977

13 Clams. (Cl. 250—6)

The present invention relates to communication systems and more particularly to wave signal equipment of the selective calling type. This application is a continuation-in-part of my copending application Serial No. 555,364, filed December 27, 1955.

Due to the rather extensive use made of the very high frequency radio communication channels and, therefore the crowded conditions at these frequencies, it is often necessary that different groups of communication stations operate on the same channel or wave length. Generally, in such a case, all the receivers within the power range of each transmitter will receive signals from that transmitter. While in some applications this may be permissible, and at times even advantageous, in many communication systems it is desirable that only certain receivers will reproduce signals from each transmitter, that is, that a selective calling provision be included so that a station will reproduce only signals having possible information for that station. This increases privacy in the system and, in the case of voice equipment, makes it unnecessary to hear signals of no concern to certain of the operators. Although selective calling equipment using tone signals of different frequency and squelch circuits in the receivers responsive to such tone has previously been used. This has generally been relatively complex and expensive and therefore not been altogether suitable for many applications.

In prior selective squelch systems a level control has been necessary for setting the squelch operating point at the receiver to obtain optimum squelch response to the tone signals without false responses on noise or undesired signals. The use of such a control is quite undesirable in communication equipment and is especially so in mobile 2-way communication equipment. It has also been necessary to maintain within close tolerances the modulation level of the tone at the transmitter in order that the sensitivity control setting at the receiver will not change. Furthermore, even with manual adjustment of the squelch operating point, difficulty may be experienced in effectively reducing response of the squelch system to noise signals and to maintain the system at a sensitive operating point for proper reception of relatively weak desired signals.

Accordingly, it is an object of this invention to provide a tone operated selective calling system which requires no sensitivity adjustment control at the receiver and a less critical tone modulation level at the transmitter.

It is also an object of the invention to provide a simple and reliable selective calling communication system so that only certain wave signal receivers in a plurality of receivers are responsive to a transmitted signal, and wherein there is reduced interference between different signals on the common channel and positive response by receiver to a desired signal.

It is another object to provide a tone operated squelch system which has high sensitivity to relatively weak desired signals and overall reduced sensitivity in the squelch system to noise signals in the absence of a desired signal, thereby reducing the tendency for false operation of the tone operated squelch system.

A further object is to provide a communication system wherein a plurality of transmitters and receivers are operative on the same carrier frequency and signals from a given transmitter are reproduced only by a specific receiver or receivers associated therewith, and wherein the operator of a receiver has a choice of rendering the receiver responsive to all the tansmitted signals or to only that of a given transmitter.

Still another object of the invention is to provide a communication system with a plurality of different transmitters and receivers wherein the receivers have tone operated squelch circuits to provide selective calling and in which the common communication channel for the transmitters is automatically monitored by an operator immediately prior to a transmission from that operator's station.

A feature of the invention is the provision of a system including a wave signal transmitter adapted to produce a carrier wave modulated by a specific tone frequency whenever the transmitter is operative, with the carrier wave also being modulated by intelligence, and an improved receiver having a squelch system with a resonant reed and driver circuit therefor which renders the receiver responsive only when a particular tone frequency is received thereby, so that another transmitter in the system transmitting the same carrier wave frequency which is modulated by a different tone frequency does not operate the receiver.

Another feature is the provision of a communication receiver adapted for selective calling and having a tone-operated squelch for rendering the receiver operative in response to a carrier wave modulated by the tone, with the squelch including a resonant reed responsive to the tone to bias to cut off a control tube in the audio frequency system of the receiver and render the audio system operative.

A further feature of the invention is the provision of a tone operated squelch circuit with a frequency selective reed responsive to a tone of particular frequency and a limiter stage to apply signals of fixed level to the reed and a filter network providing the input signals to the limiter stage for reducing possible false response of the squelch circuit to noise components in the absence of a desired signal.

Another feature of the invention is the provision of such a filter network and limiter driver stage for a frequency responsive reed wherein the filter network reduces the level of signals in the voice communication frequency range to increase the relative level of signals in the control tone range for improving the reed response to a squelch operating tone.

A still further feature is the provision of a tone operated squelch circuit combined with a noise-carrier operated squelch circuit and means for rendering one or the other of the squelch circuits operative in a communication receiver, including a switching circuit for automatically rendering the noise-carrier squelch operative when the station microphone is removed from its cradle in order to automatically monitor the communication channel prior to transmitting.

Further objects, features and the attending advantages thereof will be apparent upon consideration of the following description when taken in conjunction with the accompanying drawings in which.

Figures 1, 2:
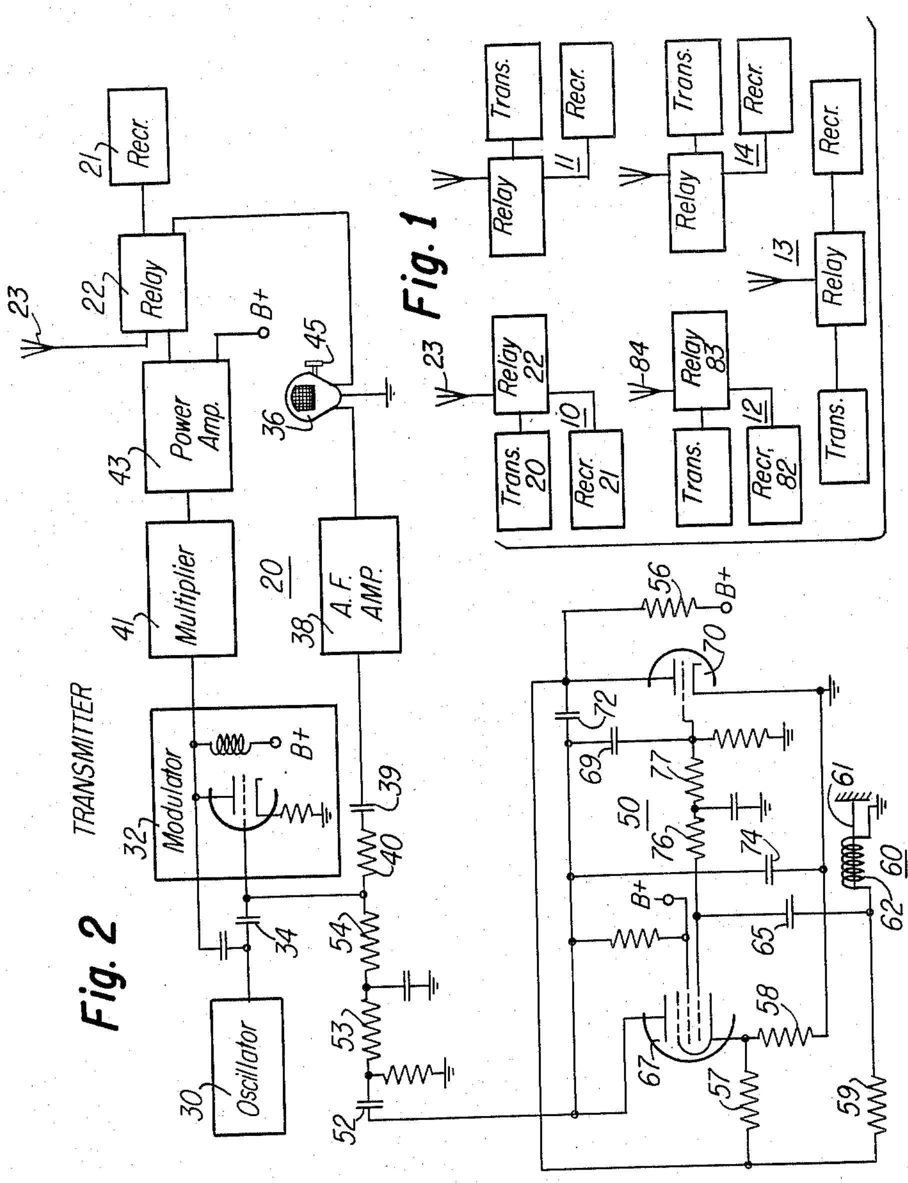
Fig. 1 is a diagram of a plurality of communication stations which incorporate the invention.
Fig. 2 is a block and schematic diagram of a transmitter incorporating the invention.

The invention provides a selective calling communication system wherein a plurality of transmitters and receivers are operative on the same carrier frequency and a transmitter automatically renders only certain receivers responsive to signals therefrom. The transmitters are arranged, whenever operated, to send a carrier wave which is modulated by a tone signal of certain low frequency, and to transmit intelligence by further modulation of the wave. The receivers in the system each include a tone-operated squelch and become operative only when a carrier wave is received which is modulated by a given tone. Thus, only receivers responsive to the tone signal modulating the carrier wave of a particular transmitter will respond to reproduce the intelligence sent by that transmitter.

The receivers incorporate a resonant reed device in the audio frequency system so that modulation of a received signal at the reed frequency causes the same to apply a cut-off bias potential to a control tube in the audio system. A cut-off condition of this tube removes a cut-off bias potential on an audio amplifier tube in the receiver, in order that modulation comprising the intelligence may be translated. A convenient frequency range for the resonant reed is between 100–150 cycles per second since these frequencies may be removed from the audio without affecting intelligibility. It is contemplated that a filter will be used to remove the tone signal from the intelligence as translated by the audio frequency channel.

The invention may also include a frequency responsive reed driven by squelch control signals applied to a filter network and limiter stage so that in the presence of a control tone a fixed level drive for the reed maintains constant bandwidth for the control tone and obviates the need for a squelch level setting control. This fixed drive further permits non-critical modulation requirements for the control tone at the transmitter. For example, it is thus unnecessary to establish at a precise fixed level the modulation deviation of the control tone in order to properly operate the receiver squelch at its control setting.

The filter network passes signals in the frequency range of the reed and in the higher frequency noise band to take advantage of the FM noise improvement for reducing the random noise energy applied to the reed in the no signal condition and for increasing the response to signals in the tone frequency range in the presence of a carrier signal. The operation of this portion of the invention will be described in greater detail in connection with the circuit of Fig. 4.

The tone operated squelch system may also be combined with a noise-carrier operated squelch so that a user of the communication receiver has a choice of which type of squelch system may be preferable at any particular time. The system may also be arranged for automatic operation in the noise-carrier squelch mode prior to transmission from a particular station in order to provide monitoring of all stations common to the communication channel to determine that the channel is clear before beginning a transmission.

Considering now a specific form of the invention, reference may be had to Fig. 1 which shows a communication system with two-way communication stations 10—14. Stations 10 and 11 may be considered base stations which are operative on the same wave length or carrier frequency. Station 10 is typical of those in the system, which may all be constructed alike, and includes a transmitter 20, a receiver 21 and a relay 22 which selectively couples either the transmitter or the receiver to antenna 23. In the example of the invention being described it may be assumed that base station 10 can inter-communicate with mobile stations 12 and 14 to the exclusion of station 13 and that the transmitter of station 11 will communicate with mobile station 13 and will not be heard at the receivers of stations 12 and 14. Various system arrangements may of course be used and the above is merely an example.

Fig. 2 shows the transmitter 20 in greater detail. This transmitter includes an oscillator 30 which feeds a modulator 32 through capacitor 34, the modulator providing angular modulation of the carrier wave from the oscillator. The modulator shown is of the phase modulation type. Audio frequency signals from microphone 36 are amplified in the audio frequency amplifier 38 and applied through capacitor 39 and resistor 40 to the modulator 32. The modulated signal is then applied to a multiplier 41 which raises the frequency of the signal. The modulated signal is coupled to amplifier 43 which provides a modulated signal of the necessary power for the desired communication purposes. Microphone 36 includes a push-to-talk switch 45 which may be operated to energize relay 22, the contacts of which (not shown) apply the signal from amplifier 43 to the antenna 23.

The transmitter 20 further includes an audio oscillator 50, or source of tone signals, also coupled to the modulator 32 to continuously modulate the carrier wave whenever the transmitter is operative. This tone signal is coupled to modulator 32 by way of blocking capacitor 52 and resistors 53, 54. In oscillator 50, a voltage divider, including resistors 56, 57 and 58 provides a D.C. starting potential applied through resistor 59 to a resonant reed 60. Reed 60, which has a vibrating arm 61 movable in a coil 62 at the natural frequency of the arm, controls the frequency of the audio signal through capacitor 65 and the control grid of pentode tube 67. The anode of tube 67 is coupled through blocking capacitor 69 to the control grid of triode tube 70. Accordingly, a signal, the frequency of which is controlled by resonant reed 60 is amplified in tube 67 and applied to tube 70. A portion of the output of tube 70 is coupled, by way of resistor 59 and capacitor 65 in order to sustain oscillation in the system. Furthermore, for increased stability there is a certain amount of inverse or negative feed-back in oscillator 50 due to the intercoupling of the control grids of tubes 67 and 70 by way of resistors 76 and 77. Additional negative feed-back for stabilizing the circuit is also provided by the intercoupling of the anode of tube 70 to the grid thereof by way of capacitors 72 and 69. Accordingly, the output of audio oscillator 50 is a highly stable tone signal which is applied to modulator 32. In a preferred form of the invention, the frequency of the tone signal furnished by oscillator 50 may be in the range of 100–150 cycles which is below the range necessary for voice communication purposes in many applications.

Figure 3:
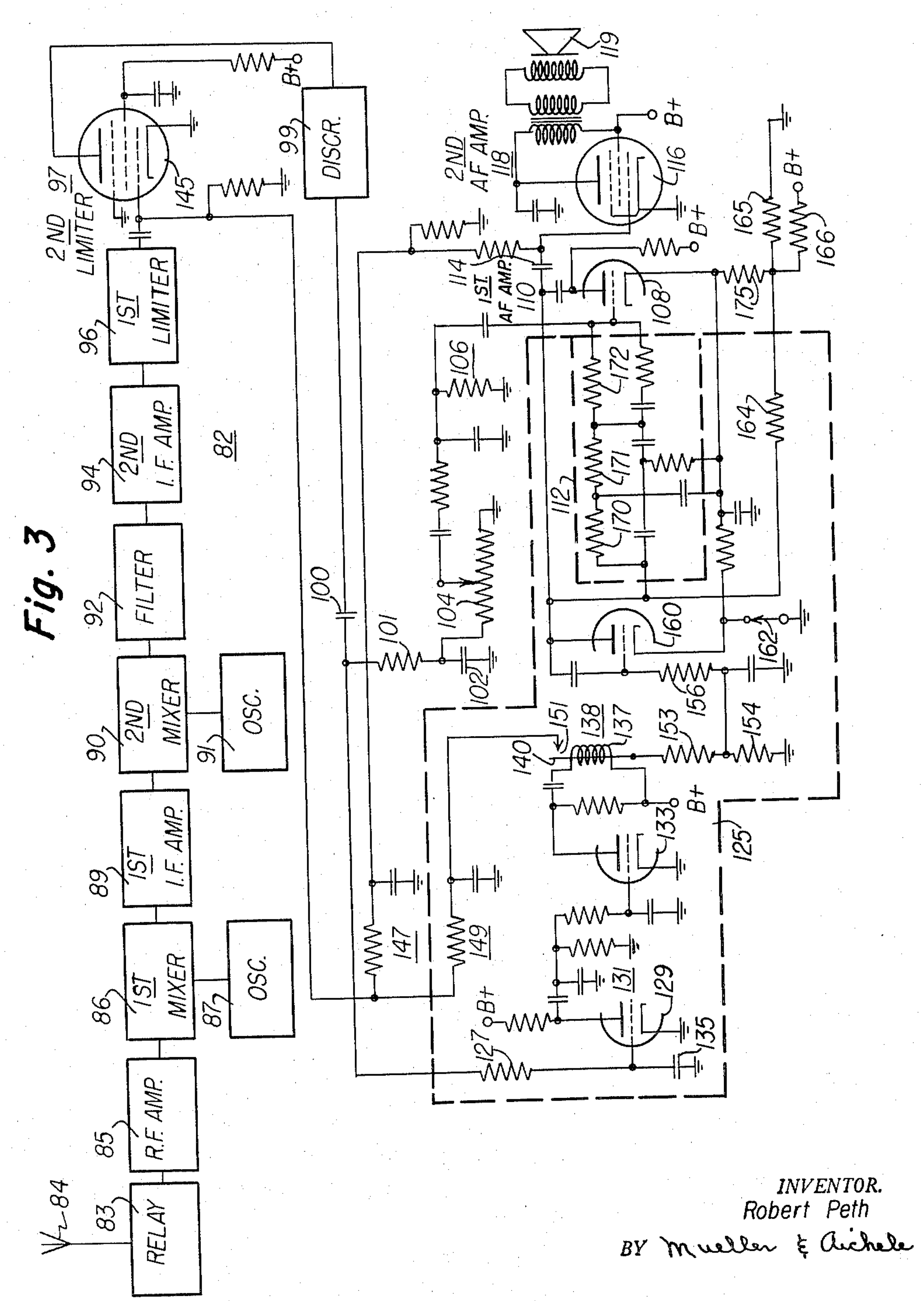
Fig. 3 is a block and schematic diagram of a receiver incorporating the invention.

Fig. 3 shows in some detail the circuit arrangement of the receiver 82 of mobile station 12 in Fig. 1. Radio frequency amplifier 85 includes a connection to relay 83 through the contacts of which antenna 84 is coupled to amplifier 85. Radio frequency amplifier 85 selects and amplifies a received signal and applies the same to the first mixer 86 to which is also connected an oscillator 87. The received signal is heterodyned in first mixer 86 and converted to a signal of intermediate frequency. This signal is applied to first intermediate frequency amplifier 89 where it is further selected and amplified after which it is coupled to second mixer 90. Oscillator 91 is also coupled to second mixer 90 and in this mixer circuit the signal is heterodyned and converted to a lower intermediate frequency signal which is fed to the filter 92. Filter 92 provides high selectivity for signals applied thereto and the signal thus selected is coupled to the second intermediate frequency amplifier 94. After further amplification in amplifier 94 the signal is applied successively to first and second limiters 96, 97 in order to remove substantially all amplitude variations thereof. The output of second limiter 97 is applied to the demodulator or discriminator circuit 99 where modulation of the received signal is derived. These demodulated signals would, of course, comprise a tone signal from oscillator 50 in the transmitter of station 10, as well as any speech signals obtained from a microphone at that station.

The voice or audio frequency signals from discriminator 99 are coupled by way of capacitor 100 to a network comprising resistor 101 and capacitor 102 in order to reduce the high frequency audio signals as commonly required when operating with a phase modulation transmitter, thus tending to provide a proper frequency relationship among the components of the audio signal. The signal is then coupled to a volume control or variable resistor 104 which may be adjusted to apply a given portion of the audio voice signal through a high pass filter network 106 to the control grid of triode tube 108 in the first audio amplifier 110.

Network 106 includes resistor and capacitor components tending to greatly attenuate the low frequency audio signals below 300 cycles in order to prevent the tone signal from being translated by the amplifier 110. An additional filter network 112 is coupled to the anode, cathode and control grid of triode 108 and this network is one which may be described as a parallel-T filter. Network 112 includes resistor capacitor combinations which altogether are resonant at a frequency of approximately 350 cycles per second. Accordingly network 112 in conjunction with network 106 provide a frequency response at the input to amplifier 110 which passes audio signals above the frequency of 300 cycles per second and substantially cuts off audio signals below that frequency. Audio signals amplified by triode tube 108 are applied through coupling capacitor 114 to the pentode tube 116 in the second audio amplifier 118. After further amplification in tube 116 the signal is then applied to loudspeaker 119, or any other utilization means.

Receiver 82 also includes a squelch control circuit 125 which regulates the conduction of tube 108 in the amplifier 110 by applying a cutoff bias potential to the grid of tube 108. Control circuit 125 receives the demodulated audio signals by way of coupling capacitor 100 and resistor 127. The audio signals are applied to the control grid of triode tube 129, and after amplification by this tube the signals are applied through filter network 131 to the control grid of triode tube 133. Capacitor 135, connected between grid and cathode of tube 129 together with low pass filter network 131, provide attenuation of the voice audio signals and in effect pass essentially the audio tones below 300 cycles per second. The output from tube 133 is coupled to coil 137 of resonant reed 138. Accordingly, when an audio tone of the frequency at which reed 138 is resonant is translated by the receiver, arm 140 of reed device 138 is driven as a vibrator. Furthermore, when a signal is being received by receiver 21, pentode tube 145 in the second limiter 97 will draw grid current through its grounded cathode as it performs its limiting function and a negative voltage with respect to ground will be available at the control grid of this tube. This negative voltage is applied by way of RC filter circuit 147 to the control grid of pentode tube 116 in amplifier 118 thus furnishing a bias for this tube. In addition, this negative control voltage is coupled by way of filter circuit 149 to a fixed contact 151 of reed device 138. The movable arm 140 of this reed device is coupled through resistors 153 and 154 to ground. Thus, it may be seen that as reed device 138 is energized a portion of the negative voltage appearing at the grid of tube 145 will appear across resistor 154.

The negative voltage so developed across resistor 154 is applied through resistor 156 to the control grid of triode tube 160. The cathode of tube 160 is normally grounded through switch 162 and the anode thereof is coupled through resistor 164 to a voltage divider consisting of resistors 165 and 166 coupled across the B+ potential source. The potential thus applied to the anode of tube 160 is such that this tube is cut off or rendered nonconductive whenever reed device 138 is energized and the negative voltage from the limiter stage is applied to the grid of tube 160. Accordingly, as tube 160 is nonconductive the potential at its anode will rise substantially to the value of the potential existing at the junction of resistors 165, 166. The junction of these resistors is also coupled through resistor 164 and a D.C. path in filter network 112, namely resistors 170, 171 and 172, to the control grid of tube 108 in audio amplifier 110. The cathode of tube 108 is returned through resistor 175 to the junction of resistors 165, 166. Resistor 175 therefore provides a cathode bias for tube 108 and the values of the various circuit components are selected so that tube 108 is in a conductive state when the potential at the junction of resistors 165, 166 is applied to the control grid thereof. Therefore, it may be seen that under such conditions the audio signals from discriminator 99 will be translated by amplifiers 110 and 118 and applied to speaker 119 to be reproduced thereby. Furthermore, the audio tone signal is filtered out by network 106, as previously described above, so that only the speech, and not the tone signal, will be reproduced by the speaker.

It should be obvious from the description given that if a tone signal of the frequency to which reed device 138 is responsive is not included in the modulation of a received signal, the negative control voltage will not be applied to cut off tube 160 and that this tube will conduct thus lowering the voltage appearing at its anode to an extent sufficient to bias tube 108 in amplifier 110 below its cutoff point. Accordingly, no audio signals will be translated by this amplifier stage. Therefore, signals from some other transmitter operative on the same carrier wave frequency to which receiver 82 is tuned will not be reproduced thereby. For example, if the transmitter of station 11 of Fig. 1, is transmitting a signal including modulation at a different tone frequency than the one to which reed device 138 is responsive, the voice signals therefrom will not be reproduced by speaker 119. That is, under such conditions the squelch control circuit 125 will not be opened to render the receiver responsive to that signal.

Switch 162 is included in the cathode to ground circuit of triode tube 160 so that the tone-operated squelch circuit 125 of the receiver may be disabled thus rendering the receiver responsive to reproduce all signals regardless of whether such signals include the audio tone to which reed device 138 is tuned. When switch 162 is open, the tube 160 will be cut off since the anode thereof is coupled to the junction of resistors 165, 166 and the cathode thereof is coupled to the cathode of tube 108 which is at a potential slightly higher than that existing at the junction of resistors 165, 166, that is, its cathode is at a higher potential than its anode. With tube 160 cut off, of course, the bias potential on the grid of tube 108 is such that this tube is operative to translate audio signals in the receiver.

Figure 4:
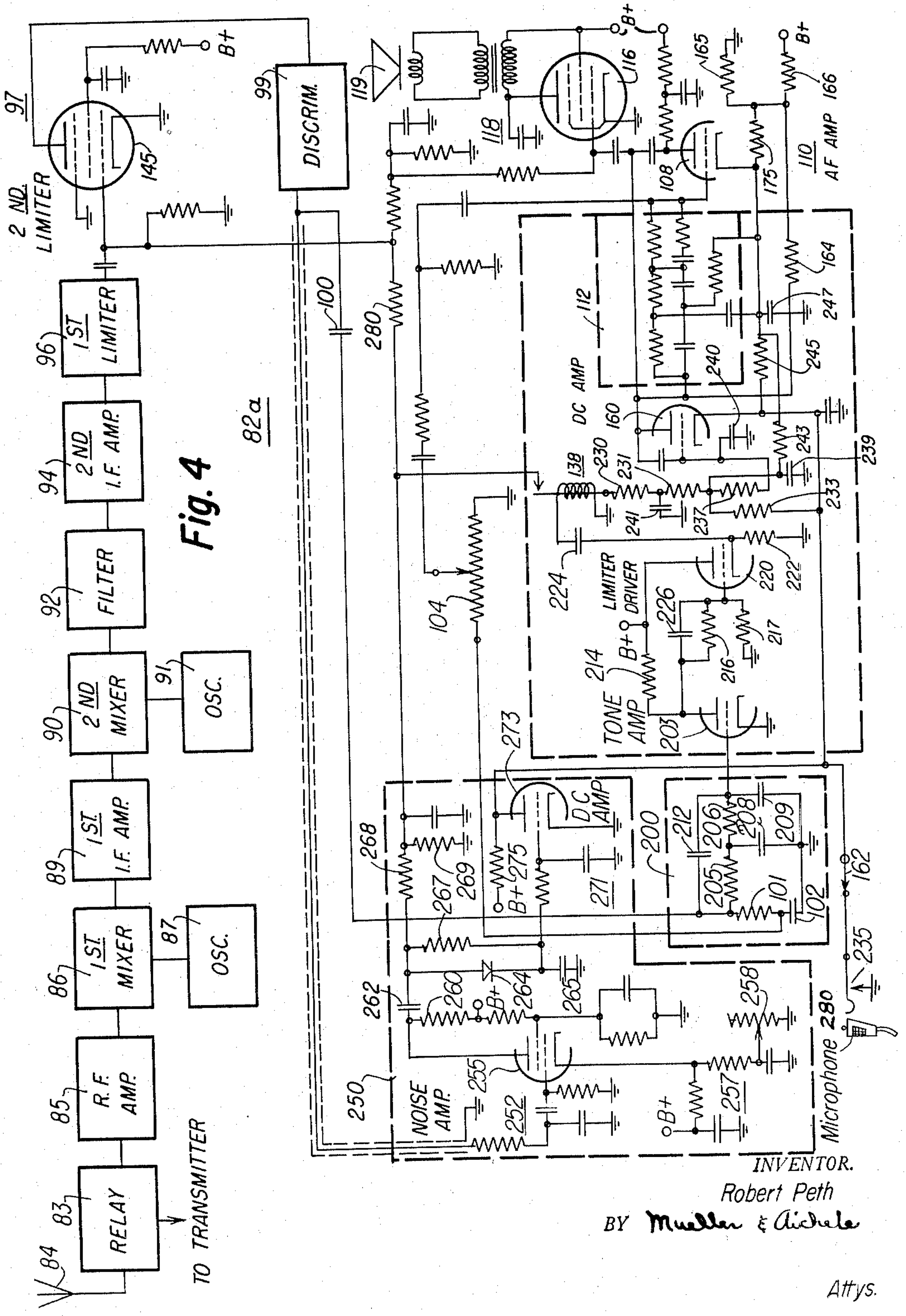
Fig. 4 is a block in schematic diagram of a receiver incorporating a further form of the invention.

Fig. 4 is a block and schematic diagram of the receiver **82*a* which corresponds in part to the receiver 82 of Fig. 3. Portions of the receiver 82*a* which function the same as those of receiver 82** are given the same reference characters.

In this form of the receiver, the demodulated audio, or voice signals are coupled from the discriminator 99 and through capacitor 100 and the de-emphasis network 101, 102 in the band reject filter 200, to the volume control 104. The variable arm of the volume control is coupled by way of an RC network to the control grid of triode 108 in the first audio amplifier 110. The signals which are amplified in the triode 108 are then applied to tube 116 and to the speaker 119. As is the case of the circuit of Fig. 3, the triode 108 is rendered operative when the direct current amplifier triode 160 is cut off and this is accomplished by the reception of a control tone to which the resonant reed 138 is tuned.

The demodulated signals from discriminator 99 are applied to the band reject filter 200 and from the output of this filter to the control grid of the tone amplifier triode 203. Filter 200 in addition to including the de-emphasis network 101, 102 comprises series connected resistors 205, 206 and shunt connected capacitors 208, 209 forming a low pass filter section of the network. Capacitor 212 is connected across resistors 205 and 206 to modify the response of the filter and couple through a portion of the higher frequencies.

The values of the components in the band reject filter 200 are chosen so that low frequency signals in the range to approximately 300 cycles are passed with high amplitude and signals in the range from 300 to approximately 1,000 cycles are substantially rejected. The response of the filter does, however, increase at the higher frequencies for signals beyond 1,000 cycles and in this range and higher, the response is substantial but somewhat less than in the low frequency range to 300 cycles. In summary the filter 200 provides high level conduction of the signals in the tone frequency range, substantial attenuation of the lower frequency voice range and medium level conduction of signals in the higher frequency voice communication range and in the higher frequency range of noise components.

The tone amplifier triode 203 has a grounded cathode and the signals are applied to the grid with respect to ground. The anode of this tube is connected to B+ through the load resistor 214. The anode is also connected to the resistors 216 and 217 which are series coupled to ground thereby forming a voltage divider between B+ and ground. Triode 220 is coupled in a limiter stage for driving the resonant reed 138. The control grid of tube 220 is connected to the junction of resistors 216, 217 and the anode thereof is connected directly to B+. The cathode of triode 220 is connected to ground through the load resistor 222. The coil of the reed 138 is coupled between ground and the cathode side of resistor 222 by means of blocking capacitor 224.

It may be noted that the control grid of triode 220 in the limiter stage is direct current coupled to the anode of tone amplifier triode 203. A capacitor 226 is connected across resistor 216 and, in the no-signal condition, the triode 220 will be biased according to its grid conduction and the bias provided by the cathode resistor 222. As signals are applied to this limiter driver stage the triode 220 provides limiting action and a fixed level drive for the reed 138.

As in the circuit of Fig. 3 the potential to cut off the direct current amplifier 160, for rendering the audio stage 110 operative, is provided by the limiter 97. This negative potential produced upon reception of a signal is applied through the contacts of the reed 138 and is developed across the series combination of resistors 230, 231, and 233. Resistor 233 is grounded through the switch 162 and contacts 235. That portion of the negative grid potential appearing across resistor 233 is applied through the series resistor 237 to the control grid of the direct current amplifier triode 160. Resistors 230, 231 and 237 together with bypass capacitors 239, 240 and 241 form a filter for the pulsating potential produced by the contacts of the resonant reed. Resistors 237, 243 and 245 form a grid leak path back to the cathode of the triode 160. Filter capacitor 247 connected between ground and the junction of resistors 243 and 245 bypasses this portion of the circuit for alternating currents.

In the tone operated squelch circuit of Fig. 4, triode 220 provides limiting of the driving signals for the reed 138 and this maintains a constant band width of response of the reed device, since the amplitude of the signals is constant. This fixed drive of the reed gives improved operation thereof and a more positive response to the control tone. Furthermore, with a limiter driver it is unnecessary to have a level setting control in the tone operated squelch circuit since the level of the driving tone signals for the reed are constant. In other systems, requiring a level setting control, it is necessary to adjust the tone amplification to be sufficient to insure operation of the tone responsive device but yet not too great to provide a wide energy band in which signals other than the particular signal to which the reed is tuned would have enough energy to cause false operation of the resonant reed. Furthermore, with a particular setting of a level control at the receiver, the tone modulation at the transmitter must be maintained constant. For example, the deviation of the control tone at the transmitter in an FM system would have to be maintained within close tolerances unless the level setting at the control of the receiver were readjusted to compensate for a change in deviation at the transmitter. However, by using the circuit of Fig. 4 the tone modulation is not critical and the constant drive provided by the limiter stage is unaffected by changes in transmitter modulation level.

The characteristics of the band reject filter 200 also play an important role in preventing false response of the resonant reed while insuring a more sensitive response in the presence of the tone of proper frequency. In a no-signal condition, the filter passes both low frequency and high frequency energy and these signals are limited to a small degree by the limiter stage so that there is a comparative reduction in the low frequency energy band (in the range of the squelch tone signals) over what would be the case in the absence of the higher frequency energy. However, when a signal is received, the noise energy is reduced due to the FM quieting action and this causes a relative increase in the energy available in the lower frequency or control tone range. This then has the effect of increasing the noise immunity of the tone operated squelch without detracting from the sensitivity thereof to the desired tones. Accordingly, with the filter network and limiter drive for the reed, it is possible to use enough power in the control tone modulation of the carrier to take advantage of the squelch selectivity to the tone and the speed of response thereto (by using short time constants in the R–C circuits for the tone signal circuits), while maintaining relatively high noise immunity or desirable falsing characteristics for the resonant reed.

In the circuit of Fig. 4 there is also shown a noise-carrier squelch circuit 250 which can be rendered operative to unblock the audio amplifier in response to reception of a carrier wave regardless of whether the wave is modulated by a control tone. In this circuit, the output of the discriminator 99 is applied through a high pass filter 252 to the control grid of the noise amplifier tube 255. The cathode of tube 255 is connected to a voltage divider 257 connected between ground and B+ and this voltage divider includes a variable resistor 258 for setting the cathode bias of the tube 255. This forms a sensitivity control to establish the level at which this squelch circuit will operate. A load resistor 260 is connected between the anode of tube 255 and B+ and the output noise signals from tube 255 are applied by way of blocking condenser 262 to the anode of diode 264. The cathode of this diode is connected to ground through capacitor 265. Series connected resistors 267, 268 and 269 are coupled across capacitor 265 as the diode load resistors. The cathode of the diode is connected through a low pass filter 271 to the control grid of a D.C. amplifier triode 273. The cathode of triode 273 is grounded and the anode is connected to B+ through a load resistor 275.

In the absence of a carrier signal, a positive voltage is developed across capacitor 265 by the noise rectified by the diode 264 and this causes increased conduction of triode 273. With either switch 162 or contacts 235 opened, the anode of triode 273 will be ungrounded and this electrode is coupled directly to the cathode of direct current amplifier 160. With the increased conduction of tube 273 due to rectified noise, the anode potential thereof will decrease and lower the cathode potential of triode 160 thereby causing this tube to remain in conduction and block the first audio triode 108.

When a carrier signal is received, the noise level decreases due to the FM quieting characteristics and the potential of the grid of triode 273 is reduced. Furthermore, the junction of resistors 268 and 269 is connected through isolating resistor 280 to the control grid of the tube 145 in the second limiter 97. Therefore, the same negative potential available at the grid of this limiter that is used to cut off the triode 160 is also applied to the control grid of triode 273 to cause greatly reduced conduction of this tube. This causes a rise in the anode potential of triode 273 and a corresponding rise in the cathode potential of triode 160, thereby cutting off this triode and unblocking the first audio stage 110.

The carrier responsive squelch circuit 250 can be rendered operative by opening switch 162. It can also be rendered operative by opening of contacts 235 which are ordinarily closed when the transmitter or microphone 280 is positioned on its cradle and is therefore not in use. However, when the microphone, which ordinarily has a push-to-talk switch and is similar to microphone 36 in Fig. 2, is picked up preparatory to transmitting, the common communication channel among all of the various stations in the selective calling system can be monitored automatically since the carrier operated squelch will function to unblock the audio system for any carrier signal that is being transmitted regardless of the code tone with which it may be modulated. It should also be apparent that a dual squelch system of this type would find utility in a system of two-way stations in which only some of the stations utilize a tone coded squelch.

It should also be pointed out that audio tones of the order of 100–200 cycles per second are used to operate the tone responsive squelch circuits and that at such frequencies reed devices such as resonant reeds 138 and 60 (Fig. 2) can be made highly selective. Therefore, many groups of stations may be included in a system having a common carrier wave frequency while still maintaining exclusive communication between selected ones of the stations by merely utilizing reed devices of different response frequency in the various transmitters and receivers. Furthermore, it has been found that low frequencies of the order of 100–200 cycles per second may be received and translated by an angular modulation receiver and cause opening of the squelch control circuit thereof even when the carrier wave modulated by such a signal is of comparatively low strength. Therefore, this system provides selective calling among various communication stations wherein rather weak signals may be received to operate selectively desired ones of the receivers in the entire system.

Since it is common to include some type of a squelch circuit in comunication receivers for two-way use, to incorporate the selective calling provision of the present invention in the squelch system adds but few additional components while still keeping the system of simple construction. Furthermore, it should also be obvious to those skilled in the communication art that the transmitter may include several audio tone oscillators operative at different frequencies in order to selectively call different receivers in a system and that various receivers in the system may include more than one frequency resonant reed device in order to be responsive to more than one transmitter in the system. In such a case, the reed devices could merely be connected in parallel so that operation of any one of the same would render the receiver responsive. Also various combinations of carrier wave frequencies and selective calling provisions can be used among the transmitters and receivers of stations such as the base and mobile stations of Fig. 1 in order to effect desired communication with necessary or advantageous privacy.

In practical operation of systems using the invention it has been found unnecessary to include specific circuitry in the transmitter to prevent transmission through the microphone of tones to cause "false" operation of a receiver. The general high selectivity of the resonant reeds and attenuation of low frequency signals in speech amplifier circuits at the transmitter have been effective in preventing such false operation.

I claim:

1. In a selective communication system wherein a plurality of wave signal transmitters are operative on a given wave length and wherein a wave signal receiver of a plurality of such receivers may be rendered responsive to signals from a given transmitter, the combination including an angular modulation transmitter having means for generating a carrier wave, means including a resonant reed device for simultaneously modulating the wave with an audio tone of selected frequency regulated by said reed device and with an intelligence signal of a frequency range higher than said selected frequency; and an angular modulation receiver having means for demodulating the carrier wave, said receiver having an amplifier for translating the demodulated intelligence only when a control is applied thereto, said amplifier including filter means in the input thereof for rejecting said audio tone, and a squelch control circuit adapted to apply said control to said amplifier when said audio tone is applied thereto by said means for demodulating the carrier wave, said squelch control circuit including amplifier means, further filter means coupled between said means for demodulating the carrier wave and said amplifier means, said further filter means being adapted to reject signals in the frequency range of the intelligence signal, a resonant reed device turned to said selected frequency and energized by said amplifier means to render said squelch control circuit operative so that said squelch control circuit is responsive only to said tone of selected frequency and an intelligence signal of a carrier wave, modulated by a tone of different frequency will not be translated by said amplifier.

2. In a selective communication system comprising a plurality of wave signal transmitters and wave signal receivers, the combination including a transmitter having means for generating a carrier wave phase modulated simultaneously by intelligence and by an audio tone of selected low frequency; and a receiver for demodulating the carrier wave, said receiver having a source of negative potential and an amplifier for the demodulated intelligence which amplifier is inoperative when a control potential is applied thereto and operative when said control potential is removed, said receiver further having a control circuit including an electron discharge device adapted to conduct and apply a control potential to said amplifier and to be nonconductive to remove said control potential, said control circuit including amplifier and low pass filter means for translating the audio tone and a resonant reed device coupled to said amplifier to be operated by a demodulated audio tone of said selected frequency, said reed device having contacts to apply said negative potential to said electron discharge device to render the same nonconductive when an audio tone of said selected frequency is present for causing said amplifier to be operative.

3. In a selective communication system wherein a plurality of wave signal transmitters are operative on a given carrier wave frequency and wherein a wave signal receiver of a plurality of such receivers may be rendered responsive to signals from a predetermined transmitter, the combination including a transmitter having means for generating a carrier wave, means for phase modulating the wave with intelligence and for simultaneously phase modulating the carrier wave with an audio tone of selected frequency below that of the intelligence; and a receiver for demodulating the carrier wave, said receiver having a limiter stage therein providing a source of negative potential and an amplifier for the demodulated intelligence which amplifier is inoperative when a control potential is applied thereto and operative when said control potential is removed, said amplifier having a high pass filter for rejecting the audio tone, said receiver further having a squelch control circuit including a control tube adapted to conduct and apply a control potential to said amplifier and to be nonconductive to remove said control potential, said squelch control circuit also including amplifier means responsive to the audio tone and a resonant reed device driven by said amplifier means and coupled to the receiver and constructed to be operated by a demodulated audio tone of said selected frequency, said reed device having contacts to apply said negative potential to said control tube to render the same nonconductive when an audio tone of said selected frequency is present for causing said amplifier in said receiver to be operative.

4. In a selective communication system wherein a plurality of wave signal transmitters and receivers are operative on a given carrier wave frequency, the combination of transmitter means adapted to transmit a carrier wave phase modulated by audio signals in a first range above 300 cycles per second and phase modulated by a narrow band audio tone signal in a second range between 100 and 150 cycles per second; and receiver means for demodulating said carrier wave including a discriminator for deriving said audio signals and said tone signal, an audio amplifier including a first electron discharge device subject to cut off by a bias potential, a filter network constructed to pass said first range coupling said discriminator to said audio amplifier, a tone operated squelch circuit including a resonant reed device, an amplifier and filter network constructed to pass said second range coupled between said discriminator and said resonant reed device, means supplying a negative control potential, said squelch circuit including a second electron discharge device having control and output elements, said resonant reed device having contacts to apply said negative control potential to said control element of said second electron discharge device and to cause nonconduction thereof in the presence of said tone signal, circuit means coupling said output element of said second discharge device to said first electron discharge device to apply a cut off bias potential thereto when said second discharge device conducts and to remove said cutoff bias potential and render said audio amplifier responsive when said second electron discharge device is nonconductive.

5. In a selective communication system, a receiver responsive to a carrier wave phase modulated by intelligence in a first frequency range and by a narrow band audio tone signal in a second frequency range below said first range, said receiver including in combination, a discriminator for deriving said intelligence and said audio tone signal, an audio amplifier including an electron discharge device operative by application of a control potential thereto, a filter network adapted to pass said first range coupling said discriminator to said audio amplifier, a tone operated squelch circuit, an amplifier and a filter network adapted to pass said second range coupled between said discriminator and said squelch circuit, said squelch circuit including a resonant reed device and circuit means for developing said control potential in response to said audio tone signal and for applying the same to said electron discharge device to render said amplifier responsive so that said intelligence is translated thereby.

6. In a selective communication system a receiver responsive to a carrier wav modulated by audio signals in a first frequency range above 300 cycles per second and by a narrow band tone signal in a second range between 100 and 150 cycles per second, said receiver including in combination a discriminator for deriving said audio signals and said tone signal, an audio amplifier including a first electron discharge device subject to cut off by a bias potential, a filter network constructed to pass said first range coupling said discriminator to said audio amplifier, a parallel T-type filter coupled to said first electron discharge device for further rejecting signals in the second range in said audio amplifier, a tone operated squelch circuit including a resonant reed device, a filter network constructed to pass said second range coupled between said discriminator and said resonant reed device, means supplying a negative control potential, said squelch circuit including a second electron discharge device having control and output elements, said resonant reed device having contacts to apply said negative control potential to said control element of said second electron discharge device and cause nonconduction thereof in the presence of said tone signal, circuit means coupling said output element of said second discharge device to said first electron discharge device to apply a cut off bias potential thereto when said second discharge device conducts and to remove said cutoff bias potential and render said audio amplifier responsive when said second electron discharge device is nonconductive.

7. In a selective communication system wherein a plurality of wave signal transmitters are operative on a given carrier wave frequency, and wherein the transmitters transmit carrier waves modulated by tones with each transmitter providing a tone of a different selected frequency, a receiver for operation in such system including means for receiving and demodulating the carrier wave, said receiver having a limiter stage therein providing a source of negative potential, an amplifier for the demodulated intelligence which amplifier is inoperative when a control potential is applied thereto and operative when said control potential is removed, and a squelch control circuit including a control tube adapted to conduct and apply a control potential to said amplifier and to be nonconductive to remove said control potential, said squelch control circuit also including an amplifier having low pass filter means for the demodulated tones, a resonant reed device coupled to said amplifier and constructed to be operated by a demodulated audio tone of one selected frequency, said reed device having contacts to apply said negative potential to said control tube to render the same nonconductive when an audio tone of said selected frequency is present for causing said amplifier in said receiver to be operative.

8. In a selective communication system, a receiver responsive to a carrier wave modulated by intelligence in a first frequency range and by a control signal in a second frequency range lower than said first range, said receiver including in combination, receiver detector means for deriving the intelligence and the control signal, amplifier circuit means including an electron discharge device, a filter network adapted to pass said first range and intercoupled between said receiver detector means and said amplifier circuit means, a tone operated squelch circuit including a resonant reed device responsive to a control signal of particular frequency, and circuit means responsive to operation of said reed device for rendering said amplifier circuit means operative, said squelch circuit further including a limiter stage coupled to said reed device and a band reject filter connected between said limiter stage and said receiver detector means, said band reject filter being constructed to reject signals in the first frequency range to reduce false response of said reed device, and said limiter stage providing a driving control signal of fixed amplitude for said reed device.

9. In a selective communication system, a receiver responsive to a carrier wave phase modulated by intelligence in a first frequency range and by a control signal in a second frequency range lower than said first range, said receiver including in combination, discriminator means for deriving the intelligence and the control signal, audio amplifier means including an electron discharge device, means for applying signals in said first range to said audio amplifier means, a tone operated squelch circuit including a resonant reed device responsive to a control signal of particular frequency, and circuit means responsive to operation of said reed device for rendering said audio amplifier means operative, said squelch circuit further including a limiter stage coupled to said reed device and a band reject filter connected between said limiter stage and said discriminator means, said band reject filter being constructed to pass signals in the second frequency range and signals above the first frequency range and to reject signals in the first frequency range to reduce false response of said reed device, and said limiter stage providing a driving control signal of fixed amplitude for said reed device.

10. In a selective communication system, a receiver responsive to a carrier wave modulated by intelligence in a first frequency range and by a control signal in a second frequency range lower than said first range, said receiver including in combination, receiver detector means for deriving the intelligence and the control signal, amplifier circuit means including an electron discharge device, a filter network adapted to pass said first range and coupled to said receiver detector means to apply the intelligence signals to said amplifier circuit means, a tone operated squelch circuit including a resonant reed device responsive to a control signal of particular frequency and circuit means including a control valve responsive to operation of said reed device for rendering said amplifier circuit means operative, said squelch circuit further including a limiter stage coupled to said reed device and a band reject filter connected to said receiver detector means, and amplifier means coupled between said band reject filter and said limiter stage, said band reject filter being constructed to reject signals in the first frequency range to reduce false response of said reed device and said limiter stage providing a driving control signal of fixed amplitude for said reed device.

11. In a selective communication system, a receiver responsive to a carrier wave phase modulated by voice intelligence in a first frequency range and by a tone control signal in a second frequency range lower than said first range, said receiver including in combination, discriminator means for deriving the voice intelligence and the control signal, audio amplifier means including an electron discharge device for translating the voice intelligence, means to apply the voice intelligence to said audio amplifier means, a squelch system including a resonant reed device responsive to a control signal of particular frequency and circuit means including a control valve responsive to operation of said reed device for rendering said audio amplifier circuit means operative, said squelch system further including a band reject filter connected to said discriminator means, tone amplifier means coupled between said band reject filter and said reed device, said band reject filter being constructed to reject signals in the first frequency range to reduce false response of said reed device and said tone amplifier means providing a driving control signal for said reed device, carrier presence detector means including a rectifier circuit coupled to said discriminator means and to said control valve for controlling the same to render said audio amplifier means operative in the presence of a carrier wave and inoperative in the absence of a carrier wave and in the presence of noise components, and switch means for rendering operative and inoperative said carrier presence detector means thereby providing respectively carrier wave squelch system operation and tone control signal squelch system operation.

12. In a selective communication system, a receiver for a carrier wave which may be phase modulated by voice signals and a control tone in a frequency range lower than the voice signals, said receiver including in combination, receiver circuit means including limiter means and discriminator means for deriving the voice signals and the control tone and noise components received by said receiver, an audio amplifier circuit for the voice signals including a filter connected to said discriminator means for rejecting signals in the frequency range of the control tone, a resonant reed operative in response to a control tone of particular frequency, a tone amplifier circuit for applying signals to said resonant reed and including filter means coupled to said discriminator means for rejecting the voice signals and applying signals in the frequency ranges above and below that of the voice signals to said tone amplifier circuit, said tone amplifier including a limiter stage for driving said resonant reed with signals of a fixed amplitude, a control circuit including an electron valve adapted to be cut off in response to operation of said resonant reed, said control circuit including means connected to said audio amplifier for rendering the same inoperative in response to cutoff of said electron valve, carrier wave squelch circuit means including a rectifier circuit connected to said receiver circuit means and responsive to the presence of a carrier wave for cutting off said electron valve and further responsive to the presence of noise signals in the absence of a carrier wave to maintain said electron valve in conduction, and switch means connected to said carrier wave squelch circuit means for disabling the same so that said audio amplifier is rendered operative only upon reception of a control tone operating said resonant reed.

13. In a selective communication system, a receiver responsive to a carrier wave phase modulated by audio intelligence in a first frequency range and by a narrow band audio tone signal in a second frequency range below said first range, said receiver including in combination, a discriminator for deriving said intelligence and said audio tone signal, an audio amplifier including an electron amplifier device and circuit means to render said electron amplifier device operative to conduct intelligence signals only upon application of a control potential of given value thereto, a filter network adapted to pass said first range and exclude said second range coupling said discriminator to said audio amplifier, a tone operated squelch circuit including an amplifier-limiter circuit for the tone signal and a filter network adapted to pass said second range coupled between said discriminator and said amplifier-limiter circuit, said squelch circuit also including a resonant reed device tuned to a tone signal and circuit means for developing said control potential in response to said audio tone signal and for applying the same to said electron amplifier device to render said audio amplifier responsive so that said intelligence is translated thereby.

References Cited in the file of this patent

UNITED STATES PATENTS

| | | |
|---|---|---|
| 2,250,596 | Mountjoy | July 29, 1941 |
| 2,321,651 | Caraway | June 15, 1943 |
| 2,479,305 | Brown | Aug. 16, 1949 |
| 2,524,782 | Ferrar et al. | Oct. 10, 1950 |
| 2,527,561 | Mayle | Oct. 31, 1950 |
| 2,743,361 | Bauman | Apr. 24, 1956 |

Disclaimer 2,918,571.—*Robert Peth*, Chicago, Ill. COMMUNICATION SYSTEM. Patent dated Dec. 22, 1959. Disclaimer filed Dec. 29, 1972, by the assignee, *Motorola, Inc.*

Hereby enters this disclaimer to claims 8, 9 and 10 of said patent.

[*Official Gazette May 1, 1973.*]